(12) United States Patent
Aspengren et al.

(10) Patent No.: US 7,338,034 B2
(45) Date of Patent: Mar. 4, 2008

(54) ELASTOMERIC SPRING

(75) Inventors: Paul B. Aspengren, Villa Park, IL (US); Steve R. White, Maple Park, IL (US); Erik D. Jensen, Batavia, IL (US); Adam J. Merges, Batavia, IL (US); Michael L. McGuigan, Maple Park, IL (US)

(73) Assignee: Miner Enterprises, Inc., Geneva, IL (US)

( * ) Notice: Subject to any disclaimer, the term of this patent is extended or adjusted under 35 U.S.C. 154(b) by 243 days.

(21) Appl. No.: 11/235,804

(22) Filed: Sep. 27, 2005

(65) Prior Publication Data

US 2007/0069435 A1    Mar. 29, 2007

(51) Int. Cl.
  *B61F 5/00*    (2006.01)
(52) U.S. Cl. .................. 267/3; 267/140; 105/199.3
(58) Field of Classification Search ............ 267/3, 267/141.2, 141, 293, 153, 152, 140; 105/199.3; 384/423
  See application file for complete search history.

(56) References Cited

U.S. PATENT DOCUMENTS

| | | | |
|---|---|---|---|
| 3,707,927 A | 1/1973 | Geyer et al. | |
| 3,735,711 A | 5/1973 | Hassenauer | |
| 3,910,655 A | 10/1975 | Willison et al. | |
| 3,915,520 A | 10/1975 | Hassenauer | |
| 3,957,318 A | 5/1976 | Wiebe | |
| 4,090,750 A * | 5/1978 | Wiebe .................. | 384/423 |
| 4,198,037 A | 4/1980 | Anderson | |
| 4,355,583 A | 10/1982 | Eggert, Jr. | |
| 4,567,833 A | 2/1986 | Hanson | |
| 4,793,720 A | 12/1988 | Merker | |
| 4,998,997 A | 3/1991 | Carlston | |
| 5,048,427 A | 9/1991 | Dumoulin | |
| 5,086,707 A | 2/1992 | Spencer et al. | |
| 5,386,783 A | 2/1995 | Rhen et al. | |
| 5,601,031 A * | 2/1997 | Carlson ................. | 105/199.3 |
| 6,092,470 A * | 7/2000 | O'Donnell ............. | 105/199.3 |
| 6,141,853 A * | 11/2000 | O'Donnell ............. | 29/446 |
| 6,341,422 B1 * | 1/2002 | O'Donnell ............. | 29/898.09 |
| 6,669,183 B2 * | 12/2003 | Detzner .................. | 267/141 |

(Continued)

OTHER PUBLICATIONS

Miner Enterprises, Inc.: TecsPak Constant Contact Side Bearings; 2000; one page, two-sided; Geneva, Illinois.

(Continued)

*Primary Examiner*—Christopher P. Schwartz
(74) *Attorney, Agent, or Firm*—Law Office of John W. Harbst

(57) ABSTRACT

An elastomeric spring including an elongated elastomeric body defining a longitudinal axis for the spring and having first and second longitudinal ends. An outer surface of the elastomeric body extends between the first and second ends and has four generally planar sides, with each planar side of the outer surface being disposed to one side of and generally parallel to the longitudinal axis of the spring so as to reduce radial bulging of the spring in all directions when an axial load is applied to the spring. The outer surface of the elastomeric body further includes four angled corner sections extending between the first and second ends of the elastomeric body and disposed a substantially common distance from the longitudinal axis of the spring. One corner section is disposed between any two adjoining sides on the outer surface of the elastomeric body.

14 Claims, 2 Drawing Sheets

U.S. PATENT DOCUMENTS 6,792,871 B2 * 9/2004 O'Donnell et al. ........... 104/16
6,957,611 B2 * 10/2005 O'Donnell et al. ...... 105/199.3

OTHER PUBLICATIONS

Miner Enterprises, Inc.; TecsPak Constant Contact Side Bearing Retrofit Kit; 2005; one page, two-sided; Geneva, Illinois.

International Searching Authority/USPTO; International Search Report associated with International Applicaion No. PCT/US06/35091; Mar. 19, 2007; 2 pages.

International Searching Authority/USPTO; Written Opinion of the International Searching Authority regarding International Application No. PCT/US 06/35091; Mar. 19, 2007; 6 pages.

* cited by examiner

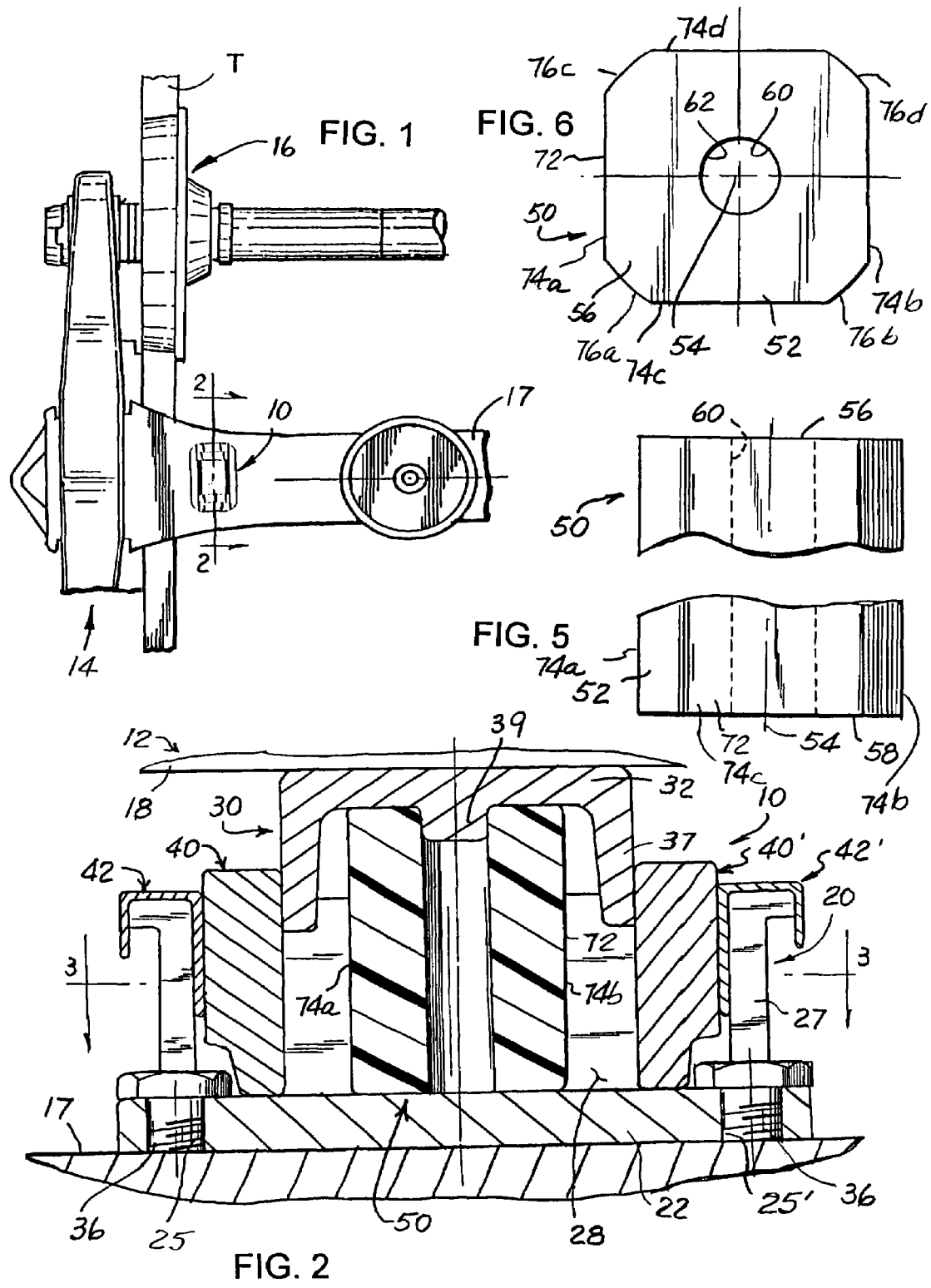

ELASTOMERIC SPRING

FIELD OF THE INVENTION

The present invention generally relates to an elastomeric spring and, more particularly, to an elastomeric spring having an outer surface with four generally planar sides, with each planar side of the outer surface being disposed to one side of and generally parallel to a longitudinal axis of the spring and connecting surfaces extending between any two adjoining sides of the spring.

BACKGROUND OF THE INVENTION

An energy absorption apparatus or spring is known to be used in various applications and between two masses. For example, a spring is commonly used and forms an integral part of a railroad car side bearing assembly. During movement of the railcar, the spring of the railcar side bearing assembly acts an energy absorption apparatus which serves to control or restrict "hunting" movements and limit "rolling" movements of the railcar about a longitudinal centerline.

Alternatively, an energy absorption apparatus or spring is frequently used as a part of a railcar buffer assembly, railcar drawbar assembly or railcar draft gear assembly. Each of these railcar devices typically include one or more springs for absorbing, dissipating, and returning energy between adjacent ends of two railcars. As will be appreciated, an increased ability to control impacts between adjacent railcars tends to increase performance characteristics of the railcar components as well as add protection to the lading carried and shipped within the railcar.

A significantly large amount of energy and excessive resultant dynamic impacts can develop in many devices which utilize a spring for damping such forces. Accordingly, the materials forming the spring must have great strength or they will likely fail under substantial end loads placed thereon, and energy impacts imparted thereto during daily operation of such devices. As will be appreciated, adverse temperature conditions only exacerbate spring problems.

In the railroad industry, it is known to equip a side bearing assembly with a cylindrically shaped column of rubber-like material. The column-like shape of the spring maximizes the volume of the spring thus allowing the spring to absorb, dissipate and return energy axially imparted thereto. As will be appreciated by those skilled in the art, and during axial compression thereof, the cylindrically shaped column of rubber-like material forming the spring tends to radially bulge outwardly. In fact, during maximum axial compression, the spring develops a very significant bulge about the longitudinal center of the spring.

Radial bulging of the spring can and often does cause serious problems. That is, lateral and longitudinal size constraints of a walled housing wherein the spring is arranged limits the size and, thus, performance characteristics of the spring. As will be appreciated, significant radial bulging of the spring can cause the spring to engage and rub excessively on the surrounding walled housing. When the spring rubs on the housing, the material from which the spring is formed is degraded and, thus, often causes premature failure of the mechanism with which the spring is operably associated.

Thus, there is a continuing need and desire for a simple but strong, reliable and yet inexpensive spring which offers the necessary force/deflection curve for the particular application and yet is designed to limit the radial bulging of the spring during operation thereof

SUMMARY OF THE INVENTION

In view of the above, and in accordance with one aspect, there is provided an elastomeric spring including an elongated elastomeric body defining a longitudinal axis for the spring and having first and second longitudinal ends. An outer surface of the elastomeric body extends between those first and second ends and has four generally planar sides, with each planar side of the outer surface being disposed to one side of and generally parallel to the longitudinal axis of the spring so as to reduce radial bulging of the spring in all directions when an axial load is applied to the spring. The outer surface of the elastomeric body further includes four angled corner sections extending between the first and second ends of the elastomeric body and disposed a substantially common distance from the longitudinal axis of the spring. One angled corner section is disposed between any two adjoining sides on the outer surface of the elastomeric body.

In one form, the elastomeric body further defines a recess which opens to at least one of the first and second ends thereof In another form, the elastomeric body defines a recess which opens to both the first and second ends thereof.

Preferably, each of the four generally planar sides on the outer surface of the elastomeric body is equidistantly spaced from the longitudinal axis of the spring. In one form, the elastomer forming the body has a plastic to elastic strain ratio greater than 1.5 to 1. In a most preferred form, the elastomer forming the body has an orientated molecular structure so as to enhance spring performance. Preferably, each corner section on the outer surface of the elastomeric body has a generally arcuate configuration.

According to another aspect, there is provided an elastomeric spring having a repeatable force/deflection curve with a substantially increasing rate which persists between initial columnar deflection and about 90% columnar deflection of the spring. According to this aspect, the spring includes an elongated elastomeric body having a generally square cross-sectional configuration capable of absorbing, dissipating and returning an end load force applied thereto. The elastomeric body defines a longitudinal axis for the spring and has first and second longitudinal ends with an outer surface extending between the first and second ends. The outer surface on the elastomeric body has four generally planar sides, with each planar side of the outer surface being disposed to one side of and generally parallel to the longitudinal axis of the spring. The outer surface of the elastomeric body further includes angled corner sections extending between the first and second ends of the elastomeric body, with one angled corner section extending between any two adjoining planar sides on the outer surface of the elastomeric body to substantially reduce stress concentrations in the elastomeric body.

In one form, the elastomeric body further defines a recess opening to at least one of the first and second ends thereof In another form, the elastomeric body defines a recess opening to both the first and second ends thereof Preferably, each corner section on the outer surface of the elastomeric body has a generally arcuate configuration. In a preferred embodiment, the a radial distance between the longitudinal axis of the spring and the planar surface defined by any one side on the outer surface of the elastomeric body is less than a distance any corner is spaced from the longitudinal axis of the spring.

Preferably, the elastomer forming the body of the spring has a plastic to elastic strain ratio greater than 1.5 to 1. In a most preferred form, the elastomer forming the body of the spring has an orientated molecular structure so as to enhance spring performance.

According to another aspect, there is provided an elastomeric spring having a repeatable force/deflection curve with a substantially increasing rate which persists between initial columnar deflection and about 90% columnar deflection of the spring. According to this aspect, the spring includes an elongated copolyesther polymer elastomeric body having a generally square cross-sectional configuration capable of absorbing, dissipating and returning end load forces applied thereto. The elastomeric body defines a longitudinal axis for the spring and has first and second longitudinal ends disposed generally normal to the axis such that an axial force applied to the spring is applied across the entire area of each end. The elastomeric body further defines an inner surface and an outer surface each extending between the first and second ends of the elastomeric body so as to define a wall thickness for the spring. The outer surface on the elastomeric body has four generally planar sides, with each planar side on the outer surface being disposed to one side of and generally parallel to the longitudinal axis of the spring. The outer surface of the elastomeric body further includes angled corner sections extending between the first and second ends of the elastomeric body, with one angled corner section being disposed between any two adjoining planar sides on the outer surface of the elastomeric body. According to this aspect, the elastomeric body is configured such that the wall thickness of the spring progressively increases along a line extending from the longitudinal axis and generally normal to one of the planar sides on the outer surface of the body and any one of the corner sections so as to reduce radial bulging of the spring in all directions when an axial load is applied to the spring.

Preferably, the elastomer forming the body of the spring has a plastic to elastic strain ratio greater than 1.5 to 1. In one form, the elastomer forming the body of the spring has an orientated molecular structure so as to enhance spring performance. In most preferred embodiment, each corner section on the outer surface of the elastomeric body has a generally arcuate configuration.

One feature of the present invention relates to providing an elastomeric spring which is both strong and reliable while remaining economical to manufacture.

Another feature of this invention relates to providing a spring which embodies the advantages of elastomers, while offering performance characteristics which exceed known elastomeric springs.

Still another feature of this invention relates to providing an elastomeric spring wherein the radial bulge of the spring, which naturally occurs upon spring compression, is limited thus optimizing spring performance.

These and other features, aims and advantages of the present invention will become more readily apparent from the following description, appended claims and drawings depicting an exemplary embodiment of the invention.

BRIEF DESCRIPTION OF THE DRAWINGS

FIG. 1 is a fragmentary top plan view of a portion of a railcar wheeled truck including one form of an energy absorption apparatus embodying principals of the present invention;

FIG. 2 is a sectional view taken along line 2-2 of FIG. 1;

FIG. 5 is a fragmentary front view of the elastomeric spring of the present invention; and FIG. 6 is a top plan view of the elastomeric spring illustrated in FIG. 5.

DETAILED DESCRIPTION OF THE INVENTION

Figure 3:
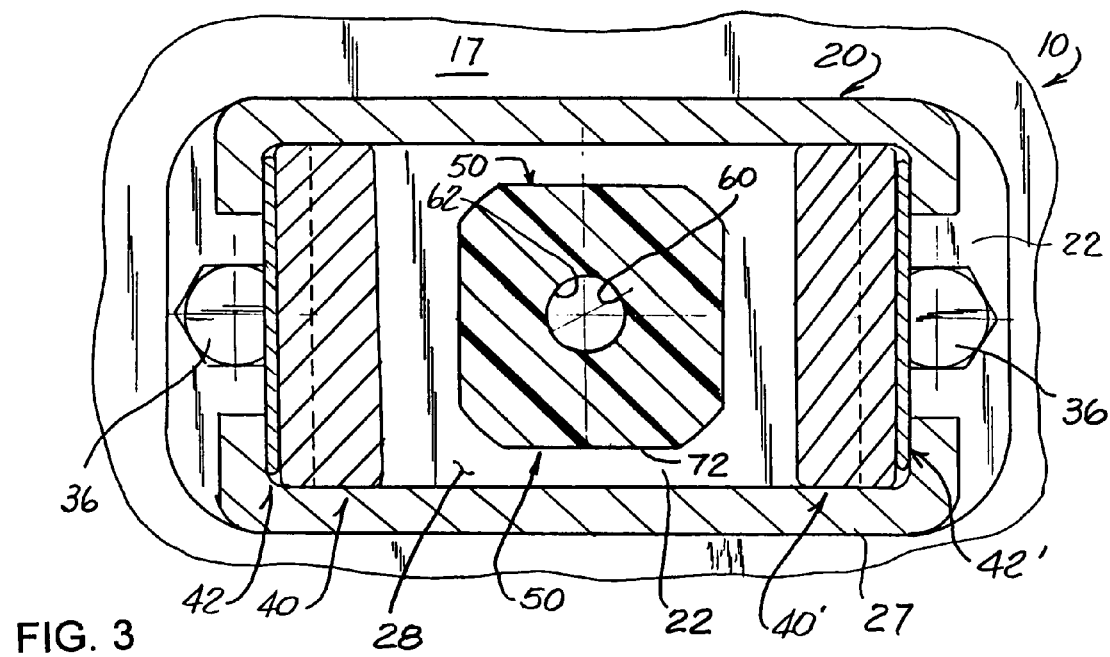
FIG. 3 is a sectional view taken along line 3-3 of FIG. 2.

While the present invention is susceptible of embodiment in multiple forms, there is shown in the drawings and will hereinafter be described a preferred embodiment of the invention, with the understanding this disclosure is intended to set forth an exemplification of the invention which is not intended to limit the invention to the specific embodiment illustrated and described.

Referring now to the drawings, wherein like reference numerals indicate like parts throughout the several views, there is shown in FIG. 1 a railcar apparatus generally identified by reference numeral 10. The principals, teachings and advantages of the present invention, however, equally apply and can be embodied in operable combination with any of a myriad of different devices without departing or detracting from the spirit and scope of this invention. In the exemplary embodiment, apparatus 10 is shown as a side bearing assembly mounted on a railcar 12 (FIG. 2). More specifically, the side bearing assembly is mounted on and in operable combination with a wheeled truck 14 forming part of a wheel set 16 which allows the vehicle or railcar 12 to ride along and over tracks T. As known, the side bearing assembly is mounted on a transversely disposed, partially illustrated, bolster 17 forming part of the truck 14 which operably supports a side and one end of a railroad car body 18 (FIG. 2) forming part of the railcar 12.

The specific configuration of the side bearing assembly is not an important consideration of the present invention; whereas, the illustrated railcar apparatus is intended only for illustrative purposes. Suffice it to say, the railcar side bearing assembly is designed to absorb, dissipate and return energy forces applied thereto during operation of the railcar 12. As shown, side bearing assembly is preferably designed as a multipiece assembly including a housing or cage 20, a cap or member 30 arranged for generally telescoping movements relative to the housing 20, and a spring 50 (FIG. 3) operably disposed between the housing 20 and cap 30.

As shown in FIGS. 2 and 3, housing 20 of apparatus 10, illustrated for exemplary purposes, is preferably formed from metal and includes a base 22 configured for suitable attachment to the railcar bolster 17 as through any suitable means, i.e., threaded fasteners or the like. In the illustrated embodiment, base 22 defines diametrically opposed opening or holes 25 and 25' (FIG. 2), respectively, allowing suitable fasteners 36 to extend therethrough for fastening the base 22, and thus, housing 20, to the bolster 17.

In the illustrated embodiment, housing 20 further includes wall structure 27 arranging in upstanding relation relative to the housing base 22. The wall structure 27 defines an internal void or open top cavity 28 wherein spring 50 is accommodated.

Like housing 20, cap or member 30 is preferably formed from metal. Cap or member 30 is adapted to telescopically move relative to housing 20. As shown in FIG. 2, cap 30 includes a top plate 32 having a generally planar configuration for frictionally engaging and establishing metal-to-metal contact with an underside or surface of the car body 18. In the embodiment shown, cap 30 also includes wall structure 37 depending from and, preferably, formed integral with the top plate 32. In the illustrated embodiment, the housing wall structure 27 and the cap wall structure 37 are configured to complement and operably cooperate relative to each other. Moreover, the housing wall structure 27 and the cap wall structure 37 surround and accommodate the spring 50 therebetween. In that form of cap 30 shown in FIG. 3, a guide or projection 39 is generally centrally provided and depends from an underside of the top plate 32.

The illustrated side bearing assembly further includes conventional solid stops 40 and 40' operably disposed between the depending wall structure 37 on cap 30 and the wall structure 27 of housing 20. As will be appreciated by those skilled in the art, the conventional stops 40 and 40' operably serve to limit travel or movement of the top plate 32 of cap 30 by a predetermined amount. Moreover, the illustrated side bearing assembly further includes conventional shims or spacers 42 and 42' arranged in operable combination with the stops 40 and 42', respectively. Collectively, the stops 40, 40' and shims 42, 42' further reduce and restrict the already limited space constraints of the spring receiving cavity 28 defined by the side bearing assembly.

Figure 4:
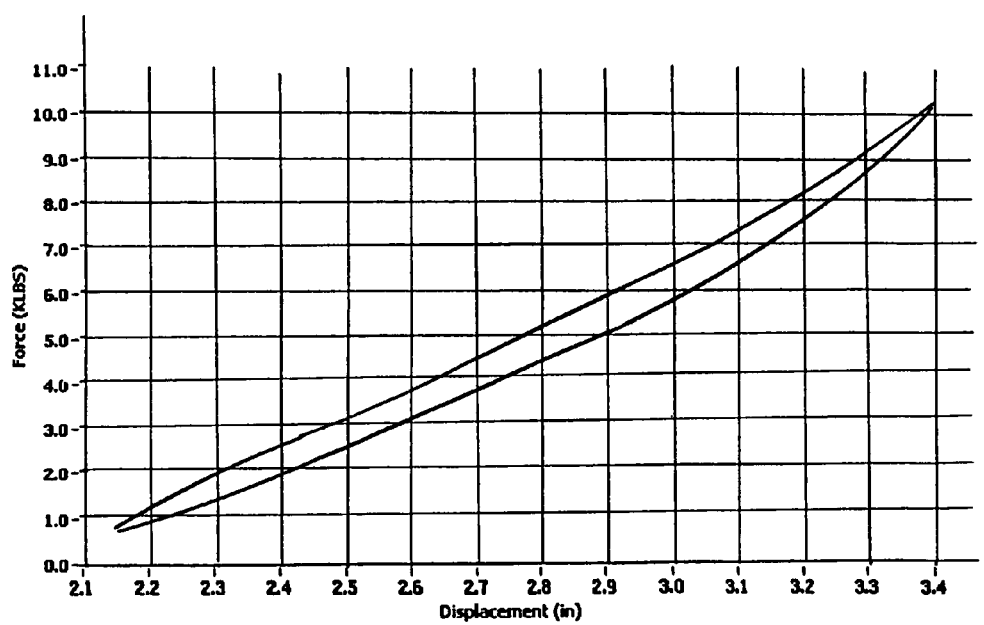
FIG. 4 is a force/deflection curve of one embodiment of the elastomeric spring for the present invention.

As shown in FIGS. 2 and 3, spring 50 is disposed within the cavity 28 of the side bearing assembly for absorbing, dissipating and returning energy imparted to the side bearing assembly. Turning to FIG. 4, spring 50 has a repeatable force/deflection curve with a substantially increasing rate which persists between initial columnar deflection and about 90% columnar deflection of the spring 50. In one embodiment, spring 50 is capable of developing at least 3,000 pounds of preload or preforce for the side bearing assembly. Moreover, in the illustrated embodiment, spring 50 is capable of withstanding an end load force ranging between about 8,000 to about 17,000 pounds. Furthermore, in the illustrated embodiment, spring 50 is designed to absorb between about 60 to about 100 foot pounds. Of course, the specific operating characteristics of spring 50 can be varied or different from those mentioned above without detracting or departing from the true spirit and scope of the present invention.

As shown in FIG. 5, spring 50 includes an elongated elastomeric body 52 which is resiliently deformable in response to an axial load being applied thereto. The tubular body 52 defines an axis 54 for the spring 50 and includes longitudinal ends 56 and 58. As shown, the ends 56, 58 of the spring 50 preferably extend generally normal to the axis 54 such that an axial force applied to the spring 50 is applied across the entire surface of each end 56, 58. In the embodiment illustrated in FIGS. 5 and 6, the elastomeric body of spring 50 defines a generally centralized recess or hole 60 opening to at least one and preferably both ends 56, 58 of the spring 50. The marginal edge of the opening or throughbore 60 defines an inner surface 62 for the elongated body 52 extending between the ends 56 and 58. It should be appreciated, however, the elongated spring body 52 could also have a solid configuration without detracting or departing from the spirit and true scope of the invention. Moreover, the tubular body 52 can be formed as a composite structure similar to that disclosed in coassigned U.S. Pat. No. 5,868,384; the applicable portions of which are incorporated herein by reference.

Suffice it to say, the thermoplastic elastomer body 52 of spring 50 can be formed from myriad of elastomeric materials. Preferably, the thermoplastic elastomer body or member 52 is formed from a copolyesther polymer elastomer of the type manufactured and sold by the DuPont Company under the tradename HYTREL. Ordinarily, a HYTREL elastomer has inherent physical properties making it unsuitable for use as a spring. Applicants' assignee, however, has advantageously discovered it is possible to impart spring-like characteristics to a HYTREL elastomer. Coassigned U.S. Pat. No. 4,198,037 to D. G. Anderson better describes the above noted polymer material and forming process and is herein incorporated by reference. Suffice it to say, spring 50 is preferably formed from the above-described thermoplastic material and has a plastic strain to elastic strain ratio greater than 1.5 to 1. Moreover, and in a preferred form, the elastomer forming he elongated body 52 has an oriented molecular structure so as to enhance performance of the spring 50.

The elastomeric spring body 52 also has an outer surface 72. As used herein and throughout, the distance between the inner surface 62 and the outer surface 72 of the elastomeric body 52 defines the "wall thickness" of the spring 50. Suffice it to say, the outer surface 72 of the elastomeric spring body 52 is specifically configured to limit or restrict radial expansion and/or radial bulging of the spring 50 in all directions when an axial load being applied thereto.

According to the present invention, the outer surface 72 of the elastomeric body 52 has four generally planar sides 74a, 74b, 74c and 74d extending between the longitudinally opposed ends 56, 58 of the elastomeric body 52. As shown in FIG. 6, each planar side 74a, 74b, 74c and 74d on the outer surface 72 is disposed or arranged to one side of and extends generally parallel to the longitudinal axis 54 of the spring 50.

Moreover, the outer surface 72 of the elastomeric body 52 has four angled corner or connecting sections 76a, 76b, 76c and 76d extending between the longitudinally opposed ends 56, 58 of the elastomeric body 52. As shown, each angled corner or connecting section 76a, 76b, 76c and 76d is disposed or arranged a substantially common distance from the longitudinal axis 54 of the spring and is disposed between any two adjoining sides 74a, 74b, 74c and 74d on the outer surface 72 of the elastomeric body 52.

In a preferred form, the elastomeric spring body 52 has a generally square cross-sectional configuration. In this form, each of the four generally planar sides 74a, 74b, 74c and 74d on the outer surface 72 of the elastomeric body 52 is equidistantly spaced from the longitudinal axis 54 of the spring 50. In those embodiments of the spring 50 wherein the spring body 52 has a generally square cross-sectional configuration, and as used herein and throughout, the term "spring width" refers to the distance measurable between any two opposed planar sides, i.e, 74a and 74b or 74c and 74d of the spring body 52. In this form, each planar side 74a, 74b, 74c and 74d on the outer surface 72 of the elastomeric body 52 is of generally equal width and ranges between about 33% and about 87% of the spring width of the spring body 52.

In a preferred embodiment, each of the angled corner or connecting sections 76a, 76b, 76c and 76d on the outer surface 72 of the elastomeric spring body 52 has a generally arcuate configuration for substantially reducing stress concentrations in the elastomeric spring body 52. In a most preferred embodiment, the generally arcuate configuration of each angled corner or connecting sections 76a, 76b, 76c and 76d on the outer surface 72 of the elastomeric spring body 52 has a generally common radius.

An important advantage realized by the present invention relates to the ability to control radial expansion/bulging of the spring 50 during a work cycle. As will be appreciated, if the spring 50 radially bulges or expands to such an extent the spring meaningfully engages with the sides of the wall structure of the device wherein the spring 50 is accommodated, the ability of the spring 50 to operate in the manner which it was designed can be adversely compromised—if not lost. The size or degree of the axial loading applied to most railcar components during a typical work cycle coupled with the restricted space constraints defined by the internal void or cavity of the such railcar components, wherein the spring is arranged, teach away from the use of an elastomeric spring in most railcar applications.

In a work cycle of a railcar side bearing assembly, the top plate 32 of the side bearing cap 30 moves toward the base 22 of housing 20 under the influence of the car body 18 pressing downwardly thereon, thus, further diminishing the already limited area of the internal void into which the elastomeric spring 50 is permitted to deform. As a result of the compressive forces exerted thereon, the elastomeric spring tends to naturally bulge radially outwardly toward the wall structure of the housing 20 and cap 30. This deformation or radial bulging/expansion of the elastomeric spring 50 is a serious concern.

The structural design of the present invention, however, controls the radial displacement/deformation of the spring 50. Moreover, the structural design of the present invention reduces stress concentrations within the elastomer body 52 of the spring 50. With the present invention, and as best shown in FIG. 5, the elastomeric body 52 is configured such that the wall thickness of the spring 50 progressively increases along a line extending from the longitudinal axis 34 and generally normal to one of the planar sides 74*a*, 74*b*, 74*c*, or 74*d* on the outer surface 52 of the elastomeric spring body 52 and any one of the angled corner sections 76*a*, 76*b*, 76*c* or 76*d* so as to reduce radial bulging of the spring 50 in all directions when axial loading is applied to either spring end 56, 58. Moreover, the recess 60 in the elastomeric body 52 operably accommodates the guide 39 on the cap 30 so as to positively maintain spring 50 in a predetermined position relative to the apparatus which accommodates the spring 50. Of course, other instrumentalities besides the guide 39 fitting into the open end of the recess 60 can be provided, i.e., recessing the underside of the top cap 32 with a cross-sectional profile corresponding to that of the end of spring 50, can likewise be used to positively position the spring 50 relative to the side bearing housing.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. An elastomeric spring, comprising:
an elongated elastomeric body for absorbing, dissipating and returning axial loads applied thereto over a full length of said elastomeric body defined between first and second longitudinal ends thereof, and with said elastomeric body defining a longitudinal axis and having an outer surface extending between said first and second ends, with the outer surface on said elastomeric body having four generally equal and generally planar sides, with each generally planar side of said outer surface being disposed a generally common distance from one side of and generally parallel to the longitudinal axis of said spring so as to reduce radial bulging of said spring in all directions when an axial compressive force is applied to said spring, and wherein the outer surface of said elastomeric body further includes four radiused corner sections extending between said first and second ends of said elastomeric body and disposed a substantially common distance both longitudinally and laterally from each other, with one radiused corner section being disposed between any two adjoining generally planar sides on the outer surface of said elastomeric body so as to minimize stress concentrations in said elastomeric body when an axial compressive force is applied to said spring.

2. The elastomeric spring according to claim 1, wherein said elastomeric body further defines a recess opening to at least one of said first and second ends thereof.

3. The elastomeric spring according to claim 1, wherein said elastomeric body further defines a recess opening to said first and second ends thereof.

4. The elastomeric spring according to claim 1, wherein the elastomer forming said body has a plastic strain to elastic strain ratio greater than 1.5 to 1.

5. The elastomeric spring according to claim 1, wherein the elastomer forming said body has an orientated molecular structure so as to enhance spring performance.

6. An elastomeric spring having a repeatable force deflection curve with a substantially increasing rate which persists between initial columnar deflection and about 90% columnar deflection of said spring, said spring comprising:
an elongated elastomeric body having a generally square cross-sectional configuration extending between first and second longitudinally spaced ends for absorbing, dissipating and returning energy applied thereto over a full length of said elastomer body defined between said ends, said elastomeric body defining a longitudinal axis for said spring and has an outer surface extending between said first and second ends, with the outer surface on said elastomeric body having four generally planar sides, with each generally planar side of said elastomeric body being disposed a generally common distance from and to one side of and generally parallel to the longitudinal axis of said spring, and wherein the outer surface of said elastomeric body further includes radiused corner sections extending between said first and second ends of said elastomeric body and spaced a substantially equal distance both laterally and longitudinally from each other, with one radiused corner section extending between any two adjoining and generally planar sides on the outer surface of said elastomeric body to minimize stress concentrations in said elastomeric body when enemy is axially applied to said spring, and with said radiused corner sections being sized such that each generally planar side of said elastomeric body comprises between about 40% and about 60% of an overall width of said spring.

7. The elastomeric spring according to claim 6, wherein said elastomeric body further defines a recess opening to at least one of said first and second ends thereof.

8. The elastomeric spring according to claim 6, wherein said elastomeric body further defines a recess opening to said first and second ends thereof.

9. The elastomeric spring according to claim 6, wherein a radial distance between the longitudinal axis of said spring and the generally planar surface defined by any one side on the outer surface of said elastomeric body is less than the distance said sections are spaced from the longitudinal axis of said spring.

10. The elastomeric spring according to claim 6, wherein the elastomer forming said body has a plastic strain to elastic strain ratio greater than 1.5 to 1.

11. The elastomeric spring according to claim 6, wherein the elastomer forming said body has an orientated molecular structure so as to enhance spring performance.

12. An elastomeric spring having a repeatable force deflection curve with a substantially increasing rate which persists between initial columnar deflection and about 90% columnar deflection of said spring, said spring comprising:

an elongated copolyesther polymer elastomeric body having a generally square cross-sectional configuration extending between first and second longitudinally spaced ends for absorbing, dissipating and returning axial forces applied thereto over a full length of said elastomer body defined between said ends, said elastomeric body defining a longitudinal axis and with said first and second longitudinal ends of said elastomeric body being disposed generally normal to said axis such that axial forces applied to said spring are applied across the entire area of each end, and with said elastomeric body further defining an inner surface and an outer surface each extending between said first and second ends of said body so as to define a wall thickness for said spring, with the outer surface of said elastomeric body having four generally planar sides extending between the first and second ends of said elastomeric body, with each generally planar side on the outer surface being disposed a substantially common distance to one side of and generally parallel to the longitudinal axis of said spring, and wherein the outer surface of said elastomeric body further includes radiused corner sections disposed a substantially constant distance both laterally and longitudinally from each other and extending between said first and second ends of said elastomeric body and between any two generally planar and adjoining sides of said elastomeric body to minimize stress concentrations in said elastomeric body when axial forces are applied thereto, and with said elastomeric body being configured such that the wall thickness of said spring progressively increases along a line extending from said longitudinal axis and generally normal to one of said generally planar surfaces on said outer surface of said elastomeric body and any one of said radiused corners so as to reduce radial bulging of said spring in all directions when an axial load is applied to said spring, and with said radiused corners being sized such that each generally planar side of said elastomeric body comprises between about 40% and about 60% of an overall width of said spring.

13. The elastomeric spring according to claim 12, wherein the elastomer forming said body has a plastic strain to elastic strain ratio greater than 1.5 to 1.

14. The elastomeric spring according to claim 12, wherein the elastomer forming said body has an orientated molecular structure so as to enhance spring performance.

* * * * *